United States Patent [19]

Price

[11] 3,910,908

[45] Oct. 7, 1975

[54] TRIGLYCIDYL ISOCYANURATE PREPARATION

[75] Inventor: Herbert P. Price, Louisville, Ky.

[73] Assignee: Celanese Coatings & Specialties Company, Jeffersontown, Ky.

[22] Filed: May 17, 1965

[21] Appl. No.: 456,549

[52] U.S. Cl. ............... 260/248 NS; 260/77.5 NC
[51] Int. Cl.² .................................. C07D 251/34
[58] Field of Search ............... 260/248, 248 NS

[56] References Cited
UNITED STATES PATENTS

| | | | |
|---|---|---|---|
| 2,741,607 | 4/1956 | Bradley et al. | 260/248 |
| 2,809,942 | 10/1957 | Cooke | 260/248 X |
| 3,288,789 | 11/1966 | Budnowski et al. | 260/248 |
| 3,300,490 | 1/1967 | Budnowski | 260/248 |
| 3,337,509 | 8/1967 | Budnowski | 260/248 X |

*Primary Examiner*—John M. Ford
*Attorney, Agent, or Firm*—Herbert P. Price; K. A. Genoni; T. J. Morgan

[57] ABSTRACT

Crystalline triglycidyl isocyanurate having an epoxide equivalent weight of 99 to about 115 and a melting point above 100°C, capable of being cured with acidic and basic hardening agents, and prepared by dehydrohalogenating the reaction product of cyanuric acid and epichlorohydrin with dispersions of alkali metal hydroxides in non-reactive organic media.

7 Claims, No Drawings

TRIGLYCIDYL ISOCYANURATE PREPARATION

This invention relates to crystalline triglycidyl isocyanurate and to a process for preparing triglycidyl isocyanurate by the reaction of cyanuric acid and epichlorohydrin.

By the process of this invention, triglycidyl isocyanurate is prepared by reacting cyanuric acid with epichlorohydrin in the proportions of at least about 9 mols of epichlorohydrin per mol of cyanuric acid, using an organic base as catalyst to form the trichlorohydrin derivative of cyanuric acid and dehydrohalogenating the chlorohydrin derivative with finely divided caustic dispersed in an organic medium. The resulting triglycidyl isocyanurate is readily purified by crystallization from an organic polar solvent, producing free-flowing crystals of triglycidyl isocyanurate having a low chlorine content and high epoxide content.

Cyanuric acid is a symmetrical 6-member ring compound having alternating carbon and nitrogen atoms, and having the empherical formula of $C_3N_3O_3H_3$. It can exist in two tautomeric forms. In one form, cyanuric acid is a symmetrical trihydric triazine with three hydroxyl groups on the three carbon atoms. In the other form, cyanuric acid is made up of alternating CO and NH groups. Cyanuric acid can be changed from one tautomeric form to another and may react in one form or in the other resulting in either O-esters or N-esters, the O-esters being called cyanurates and the N-esters being called isocyanurates. Infra-red curves of cyanurates have a strong absorption band at 6.4 microns and exhibit substantially no absorption at 5.9 microns. Isocyanurates absorb strongly at 5.9 microns but do not absorb at 6.4 microns. In this invention, wherein epichlorohydrin is reacted with cyanuric acid followed by dehydrohalogenation with caustic, isocyanurates are formed to the substantial exclusion of cyanurates, as evidenced by the infra-red analysis.

In the process of this invention, cyanuric acid first is reacted with epichlorohydrin in an excess of epichlorohydrin using an organic base as catalyst to form trichlorohydrin isocyanurates. Cyanuric acid is substantially insoluble in epichlorohydrin. However, when cyanuric acid and epichlorohydrin are heated with agitation in the presence of an organic basic catalyst, the cyanuric acid gradually dissolves in the epichlorohydrin and at the same time reacts with the epichlorohydrin to form soluble trichlorohydrin derivatives of cyanuric acid.

In order to prepare triglycidyl isocyanurates in good yields and in good purity, it is necessary to use an excess of epichlorohydrin wherein the epichlorohydrin serves both as a reactant and as a solvent. Cyanuric acid and epichlorohydrin will react in the proportions of three mols or less of epichlorohydrin per mol of cyanuric acid. However, considerable amounts of polymeric glycidyl derivatives result due to interaction of cyanuric acid with the formed triglycidyl isocyanurate. In order to prepare triglycidyl isocyanurate in good purity, it is necessary to use at least about 9 mols of epichlorohydrin per mol of cyanuric acid. The preferred proportions are at least about 9 mols of epichlorohydrin per mol of cyanuric acid, up to about 15 mols of epichlorohydrin. Larger quantities can be used if desired, but they give no particular advantage since the unreacted epichlorohydrin must be recovered for matters of economy.

The organic base catalysts used in this invention include tertiary amines and quaternary ammonium compounds, such as quaternary ammonium hydroxide and quaternary ammonium salts. Examples of such compounds are tripropyl amine, tributyl amine, benzyl dimethyl amine, dimethyl aniline, benzyl trimethyl ammonium hydroxide, benzyl trimethyl ammonium chloride, benzyl trimethyl ammonium methoxide and quaternary ammonium ion exchange resins. These compounds contain no groups reactive with epoxide groups other than the tertiary amine or quaternary ammonium group. The catalysts are used in catalytic amounts which are from about 0.1 to about 5 weight percent based upon the cyanuric acid.

In forming the trichlorohydrin derivatives of cyanuric acid, epichlorohydrin, cyanuric acid and catalyst are heated at a temperature of about 80°C. up to the boiling point of epichlorohydrin for a period of about one-half hour to about 4 hours. It is preferred to carry out the reaction at the boiling point of epichlorohydrin since the temperature can be quite readily controlled by the refluxing epichlorohydrin. The rate and extent of reaction are determined by noting the solubilization of the cyanuric acid. When all the cyanuric acid is dissolved in the epichlorohydrin, the trichlorohydrin derivative formation is substantially complete.

The trichlorohydrin derivatives of cyanuric acid while still dissolved in the excess epichlorohydrin are dehydrohalogenated with an alkali metal hydroxide to form triglycidyl isocyanurate. In carrying out the process of this invention, finely divided alkali metal hydroxide dispersed in an organic medium is used as the dehydrohalogenating agent. It has been found that by using such alkali metal hydroxide dispersions, triglycidyl isocyanurate is produced having a low chlorine content and a high epoxide content. The preferred alkali metal hydroxide is sodium hydroxide although potassium hydroxide can be used. The dehydrohalogenation reaction is conducted by adding the alkali metal hydroxide dispersion to the chlorohydrin-epichlorohydrin solution at a temperature of about 30°C. to about 75°C. Dehydrohalogenation will take place at higher temperatures but side reactions are supressed at the lower temperatures and purer products can be made. The dehydrohalogenation reaction is exothermic so the caustic dispersion is introduced into the system at a rate sufficient to keep the temperature within the limits hereinbefore defined. The amount of caustic used in the dehydrohalogenation reaction is approximately 3 mols per mol of cyanuric acid reacted initially.

The alkali metal hydroxide dispersions, or caustic dispersions, as they will be referred to hereinafter, which are used in the process of this invention are dispersions or suspensions of finely divided caustic in an organic medium. The caustic is preferably sodium hydroxide, although potassium hydroxide can be used. The dispersing medium is an organic compound which is substantially unreactive with the caustic, is substantially a non-solvent for the caustic, contains no groups which are reactive with epoxide groups, is liquid above about 20°C., and has a boiling point above about 40°C. Such dispersing media include compounds containing hydrocarbon groups and hydrocarbon ether groups. Each of such compounds are hexane, octane, decane, dioxane, diisopropyl ether, dibutyl ether, benzene, toluene, xylene, and the like, that is hydrocarbons containing from about 6 to about 20 carbon atoms and hydrocarbon ethers containing from about 4 to about 10 carbon atoms and 1 to 2 ether linkages.

Caustic dispersions can be quite simply made by stirring a finely divided caustic into the dispersing media. However, since caustic, especially in a finely divided form, is quite hygroscopic, it is preferred to add the caustic to the dispersing media as flakes or pellets and to grind the caustic into a finely divided form while in the dispersing media. The grinding operation can be carried out in ball mills, roll mills, dispersators and the like. Dispersions can be made which contain from about 10 weight percent up to about 60 weight percent caustic, the preferred caustic content being from about 30 to about 50 weight percent.

Although caustic dispersions can be made using no additives, it is preferred to use a dispersing agent when the dispersion is made by grinding. Monomeric and polymeric fatty acids, that is acids having at least about 12 carbon atoms in their hydrocarbon chain, have been found to be very good dispersing agents for this system. These dispersing agents can be used in amounts from about 0.1 to about 1 weight percent based upon the weight of the total dispersion. Although the caustic has a tendency to settle out in these dispersions, it can be quite readily re-dispersed with agitation. The particle size of the caustic in the dispersions is from about 1 to about 100 microns with the average particle size being from about 5 to about 10 microns.

The caustic dispersions used in the process of this invention are quite mobile and can be pumped and poured. The small particle size of the caustic furnishes greatly increased surface area which increases the reactivity of the caustic in the reaction giving shorter reaction times. The organic dispersing media also protects the caustic from atmospheric moisture.

When the dehydrohalogenation reaction is completed, the salt formed in the reaction is removed by filtration or by any other means known to those skilled in the art. The excess epichlorohydrin is separated from the triglycidyl isocyanurate product by distillation. During this distillation step, care must be used to keep the temperature below 130°C. Triglycidyl isocyanurate will interact with epichlorohydrin and with itself at elevated temperatures yielding high chlorine and low epoxide-containing products. It is preferred to conduct the distillation of excess epichlorohydrin under vacuum in order to minimize the heat and the heating time used. Triglycidyl isocyanurate is produced having an epoxide equivalent weight of about 124 to about 135, (theoretical epoxide equivalent weight is 99), a chlorine content of about 2 to about 3 percent, and a melting point (Durran's Mercury Method) of about 25°C. to about 35°C.

The triglycidyl isocyanurate so produced can be purified by subsequent treatments with dispersed caustic. The triglycidyl isocyanurate is dissolved in a suitable solvent, preferably a low boiling ketone having 2 to about 5 carbon atoms. Dispersed caustic, about 0.1 to about 0.4 mol per mol of triglycidyl isocyanurate, is added to the solution at a temperature of about 30°C. to about 75°C. to react with the chlorine residue. The salt formed in the reaction is removed and the solvent is distilled off at a temperature below 130°C. Chlorine is lowered to about 1 percent with one treatment and below 1 percent with subsequent treatments.

The amorphous triglycidyl isocyanurate produced by the process of this invention either with or without post-treatment with dispersed caustic will crystallize. Free-flowing crystalline triglycidyl isocyanurate is produced by dissolving the crude product in a polar organic solvent, preferably methanol, ethanol or isopropanol with or without added water, cooling the solution to below 10°C., and letting it stand until crystallization occurs. Crystalline triglycidyl isocyanurate is obtained having epoxide equivalent weights of less than 115 down to about 99, chlorine contents of less than 0.4 weight percent and melting points above 100°C.

Crystalline triglycidyl isocyanurate has excellent stability at room temperature and does not have to be stored under refrigeration in order to prevent loss of epoxide content and gelation.

Crystalline triglycidyl isocyanurate has excellent reactivity with the well-known epoxide resin curing agents forming well cured, strong, solvent-resistant products. It is especially adaptable for use in molding powders because it can be powdered, has a sharp melting point and high reactivity.

The invention can be better understood by the following examples. The invention is not to be limited to the details described. Parts, where used, are parts by weight.

CAUSTIC DISPERSION PREPARATION

EXAMPLE A 600 parts of dioxane, 400 parts of flake sodium hydroxide and 2 parts of stearic acid were mixed for 3 minutes in a Waring Blendor. The mixture was then ground for 22 hours in a pebble mill. The resulting dispersion was smooth and white.

The particle size of the sodium hydroxide in the dispersion, as determined by microscopic examination, ranged from 1 to 10 microns with an average size of about 5 microns.

EXAMPLE B

A pebble mill was charged with 600 parts of xylene, 400 parts of sodium hydroxide and 4 parts of dimerized fatty acids. The mixture was ground for 23 hours, producing a smooth, white dispersion.

TRIGLYCIDYL ISOCYANURATE PREPARATION

EXAMPLE 1

To a suitable reaction flask equipped with a stirrer, thermometer, condenser and dropping funnel were added 129 parts of cyanuric acid, 1388 parts of epichlorohydrin and 7 parts of a 60 percent aqueous solution of benzyl trimethyl ammonium chloride. To the dropping funnel was added a caustic dispersion made from 120 parts of finely divided sodium hydroxide, 180 parts of xylene, and 1.2 parts of dimerized fatty acids. Heat and stirring were applied to the flask raising the temperature to 110°C. The temperature was gradually raised to 122°C. over a one-hour period. The cyanuric acid gradually dissolved in the epichlorohydrin, and a complete solution was obtained at the end of the heating period. The solution was cooled to 32°C. and the caustic dispersion was then added over a period of 1 hour and 15 minutes while keeping the temperature below 51°C. After all the dispersion had been added, the reactants were held at 40°C. to 50°C. for 50 minutes. The reaction flask was then fitted with a distillation head and the water formed in the reaction along with epichlorohydrin was distilled to a flask temperature of 122°C. After cooling, the salt was filtered from the reactants and the unreacted epichlorohydrin was removed by distillation to a flask temperature of 105°C. under a pressure of 5–10 mm. Hg. 314 parts of triglycidyl isocyanurate were obtained having an epoxide equivalent weight of 130.9 and a chlorine content of 2.15.

EXAMPLE 2

To a suitable reaction flask equipped as described in Example 1 were added 129 parts of cyanuric acid, 1388 parts of epichlorohydrin and 7 parts of a 60 percent aqueous solution of benzyl trimethyl ammonium chloride. The reactants were heated for 1 hour at 113°C. to 122°C. During this heating period, the cyanuric acid completely dissolved in the epichlorohydrin. The reactants were cooled to 31°C. and a caustic dispersion (120 parts sodium hydroxide, 180 parts xylene and 1.2 parts dimer acid) was added over a 1.5 hour period allowing the temperature to rise slowly from 31°C. to 51°C. After all the caustic dispersion had been added, the temperature was slowly raised to 122°C. to remove the water of reaction along with epichlorohydrin. The salt was then removed by filtration and the excess epichlorohydrin was removed by vacuum distillation, 5 – 10 mm. Hg. pressure, to a flask temperature of 122°C. The resinous product was dissolved in 400 parts of methyl ethyl ketone and a caustic dispersion (16 parts sodium hydroxide, 22 parts xylene, and 0.16 part dimerized fatty acid) was added over a 7 minute period at 47°C. to 50° C. The temperature was held at 45°C. to 50°C. for 13 additional minutes and was then raised to 86°C. to remove the water of reaction. Salt was filtered from the reactants and the solvents were removed by vacuum distillation, 5 – 10 mm. Hg. pressure, to a flask temperature of 108°C. 254 parts of triglycidyl isocyanurate were recovered having an epoxide equivalent weight of 122 and a chlorine content of 1.07 percent.

EXAMPLE 3

Using the same procedure as described in Example 2, 252 parts of amorphous triglycidyl isocyanurate were prepared. This resinous product was dissolved in 1,008 parts of methanol containing 150 parts of water. After standing overnight at 0°C., 128 parts of crystalline triglycidyl isocyanurate were recovered having an epoxide equivalent weight of 114.

100 parts of the crystalline triglycidyl isocyanurate product and 135 parts of hexahydrophthalic anhydride were codissolved by heating to 90°C. The solution was poured into a preheated mold and was heated at 125°C. for 1 hour and at 150°C. for 16 hours. A well-cured casting was obtained having tensile strength of 8497 psi, flexure strength of 16,374 psi, Izod impact of 0.269, Shore D hardness of 91, heat distortion temperature of 186°C., and water absorption of 0.27 percent.

EXAMPLE 4

Using the same procedure as was described in Example 2, 774 parts of cyanuric acid, 8325 parts of epichlorohydrin and 36 parts of a 60 percent aqueous solution of benzyl trimethyl ammonium chloride were reacted followed by dehydrohalogenation with a caustic dispersion containing 720 parts of sodium hydroxide, 1080 parts of xylene and 7.2 parts of dimer acids. After removal of the epichlorohydrin and salt, the amorphous product was post-treated using the same procedure as described in Example 2 with a caustic dispersion containing 72 parts of sodium hydroxide, 108 parts of xylene and 0.72 part of dimerized fatty acid. 1335 parts of amorphous triglycidyl isocyanurate were obtained. This product was dissolved in 5340 parts of methyl alcohol and the solution was cooled for 16 hours at 0°C. 821 parts of crystalline triglycidyl isocyanurate were recovered having an epoxide equivalent weight of 103, percent chlorine of 0.3 and a melting point of 100°C. to 104° C. After one year, the epoxide equivalent weight was found to be 109, indicating good shelf stability.

A small quantity of the crystalline triglycidyl isocyanurate was recrystallized three times from methanol, obtaining a product having an epoxide equivalent weight of 101, a chlorine content of 0.07 weight percent and a melting point of 157°C. to 158°C.

70 parts of the crystalline triglycidyl isocyanurate were co-dissolved with 70 parts of the diglycidyl ether of p,p'-dihydroxydiphenyl propane (epoxide equivalent weight — 190), and 22.5 parts of metaphenylene diamine, by heating with stirring to 75°C. This solution was poured into a mold and was heated for 16 hours at 75°C., 2 hours at 150°C. and 6 hours at 200°C. A well-cured casting was obtained which had a heat distortion temperature of 257°C.

The triglycidyl isocyanurate produced by the process of this invention in either the amorphous or crystalline form is useful in the production of protective coatings, molding resins, adhesives and the like. It can be cured with any of the well-known conventional epoxy resin curing agents to produce insoluble and infusible products.

It is to be understood that the foregoing detailed description is given merely by way of illustration and that many variations may be made therein without departing from the spirit of the invention.

The embodiments of the invention in which an exclusive property or privilege is claimed are defined as follows:

1. In a process for preparing triglycidyl isocyanurate which comprises reacting cyanuric acid and epichlorohydrin in the proportions of at least 9 mols of epichlorohydrin per mol of cyanuric acid using as a catalyst a tertiary amine or a quaternary ammonium compound, wherein said catalyst contains no groups reactive with epoxide groups other than tertiary amine and quaternary ammonium groups, to form the trichlorohydrin derivative of cyanuric acid, and dehydrohalogenating the chlorohydrin derivative while dissolved in the excess epichlorohydrin with an alkali metal hydroxide, the improvement which comprises introducing the alkali metal hydroxide into the reaction medium as a dispersion having a particle size of about 1 to about 100 microns in an organic medium, wherein the organic medium is substantially non-reactive with the alkali metal hydroxide and is substantially a non-solvent for the alkali metal hydroxide.

2. The process of claim 1 wherein the alkali metal hydroxide is sodium hydroxide.

3. The process of claim 1 wherein the alkali metal hydroxide dispersion is a 10 to 60 weight percent dispersion of sodium hydroxide in an organic medium selected from at least one member of the group consisting of hydrocarbons containing from about 6 to about 20 carbon atoms and hydrocarbon ethers containing from about 4 to about 10 carbon atoms and 1 to 2 ether linkages and wherein the sodium hydroxide has a particle size of from about 1 to about 100 microns.

4. The process of claim 1 wherein the alkali metal hydroxide dispersion is made by grinding the alkali metal hydroxide in the organic medium using as a dispersing agent monomeric or polymeric fatty acids having at least about 12 carbon atoms in their hydrocarbon chains in the amount of about 0.1 to about 1 weight percent based upon the weight of the total dispersion.

5. In a process for preparing free flowing crystalline triglycidyl isocyanurate which comprises reacting cyanuric acid and epichlorohydrin in the proportions of 15 mols of epichlorohydrin per mol of cyanuric acid, wherein the epichlorohydrin is a reactant and a solvent in the process, using as a catalyst, a tertiary amine or a quaternary ammonium compound, wherein said catalyst contains no groups reactive with epoxide groups other than tertiary amine and quaternary ammonium groups, to form the trichlorohydrin derivative of cyanuric acid, dehydrohalogenating, without removal of the excess epichlorohydrin, at a temperature below about 75°C., the chlorohydrin derivative with sodium hydroxide and crystallizing the amorphous triglycidyl isocyanurate from an alcohol containing 1 to 3 carbon atoms, the improvement which comprises introducing the sodium hydroxide into the reaction medium as a dispersion having a particle size of about 1 to about 100 microns in an organic medium selected from at least one member of the group consisting of hydrocarbons containing from about 6 to about 20 carbon atoms and hydrocarbon ethers containing from about 4 to about 10 carbon atoms and 1 to 2 ether linkages, said organic medium being free from groups reactive with sodium hydroxide and with epoxide groups.

6. The process of claim 5 wherein the alcohol is methanol.

7. The process of claim 6 wherein the sodium hydroxide dispersion is made by grinding the sodium hydroxide in the organic medium using as a dispersing agent monomeric or polymeric fatty acids having at least about 12 carbon atoms in their hydrocarbon chains in the amount of about 0.1 to about 1 weight percent based upon the weight of the total dispersion.

* * * * *